United States Patent (10) Patent No.: US 10,921,631 B2
Lin et al. (45) Date of Patent: Feb. 16, 2021

(54) DISPLAY DEVICE (71) Applicant: Au Optronics Corporation, Hsinchu (TW)

(72) Inventors: Cheng-Hsing Lin, Tainan (TW); Yen-Hua Lo, Taichung (TW); Hsin-Chun Huang, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/596,693

(22) Filed: Oct. 8, 2019

(65) Prior Publication Data

US 2020/0326583 A1 Oct. 15, 2020

(30) Foreign Application Priority Data

Apr. 15, 2019 (TW) ................................. 108112990

(51) Int. Cl.
*G02F 1/1335* (2006.01)
*G02F 1/1339* (2006.01)

(52) U.S. Cl.
CPC .. *G02F 1/133504* (2013.01); *G02F 1/133512* (2013.01); *G02F 1/133526* (2013.01); *G02F 1/1339* (2013.01); *G02F 2202/28* (2013.01)

(58) Field of Classification Search
CPC ......... G02F 1/133504; G02F 1/133512; G02F 1/1339; G02F 1/133526; G02F 2202/28

USPC ......................................................... 349/110
See application file for complete search history.

(56) References Cited

U.S. PATENT DOCUMENTS

| 8,155,514 | B1 | 4/2012 | Chow et al. |
| 8,364,032 | B2 | 1/2013 | Chow et al. |
| 2012/0070140 | A1 | 3/2012 | Chow et al. |
| 2012/0148225 | A1 | 6/2012 | Chow et al. |
| 2018/0259321 | A1 | 9/2018 | Zhang |
| 2018/0373370 | A1* | 12/2018 | Jung ...................... H04M 1/22 |
| 2019/0094014 | A1 | 3/2019 | Zhang |

FOREIGN PATENT DOCUMENTS

| CN | 102741247 | | 4/2012 |
| CN | 106941541 | | 7/2017 |
| CN | 106973212 | | 7/2017 |
| CN | 108989508 | | 12/2018 |
| CN | 108989508 | A * | 12/2018 |
| CN | 109541849 | | 3/2019 |
| WO | 2018236049 | | 12/2018 |

* cited by examiner

*Primary Examiner* — Nathanael R Briggs
*Assistant Examiner* — William D Peterson
(74) *Attorney, Agent, or Firm* — JCIPRNET (57) ABSTRACT

A display device includes a display module, a lens module and a transparent cover. The display module is provided with a lens area and a display area disposed outside the lens area. The display module is provided with a prism layer surrounding the lens area. The lens module is disposed in the lens area. The transparent cover covers the display module.

17 Claims, 12 Drawing Sheets

DISPLAY DEVICE

CROSS-REFERENCE TO RELATED APPLICATION

This application claims the priority benefit of Taiwan application no. 108112990, filed on Apr. 15, 2019. The entirety of the above-mentioned patent application is hereby incorporated by reference herein and made a part of this specification.

BACKGROUND OF THE INVENTION

Field of the Invention

The disclosure generally relates to a display device, in particular, to a display device with a lens module.

Description of Related Art

At present, in order to improve convenience for use of products, many manufacturers integrate display devices with cameras. For example, a camera function is usually added to an existing mobile phone or tablet computer.

In an existing mobile phone or tablet computer, there is a high probability that light refracted in a display device interferes with a front lens. For example, in a liquid crystal display device with a front lens, light emitted by a backlight module is reflected to the front lens by a cover plate of an outermost layer, which seriously affects the light receiving quality of the front lens. In order to improve the light receiving quality of the front lens, there is an urgent need for a method to alleviate the above-mentioned problem at present.

SUMMARY OF THE INVENTION

The invention provides a display device, which improves the light receiving quality of a lens module.

At least one embodiment of the invention provides a display device, which includes a display module, a lens module and a transparent cover. The display module is provided with a lens area and a display area disposed outside the lens area. The display module is provided with a prism layer surrounding the lens area. The lens module is disposed in the lens area. The transparent cover covers the display module.

In order to make the aforementioned and other objectives and advantages of the invention comprehensible, embodiments accompanied with figures are described in detail below.

DESCRIPTION OF THE EMBODIMENTS

Figure 1:
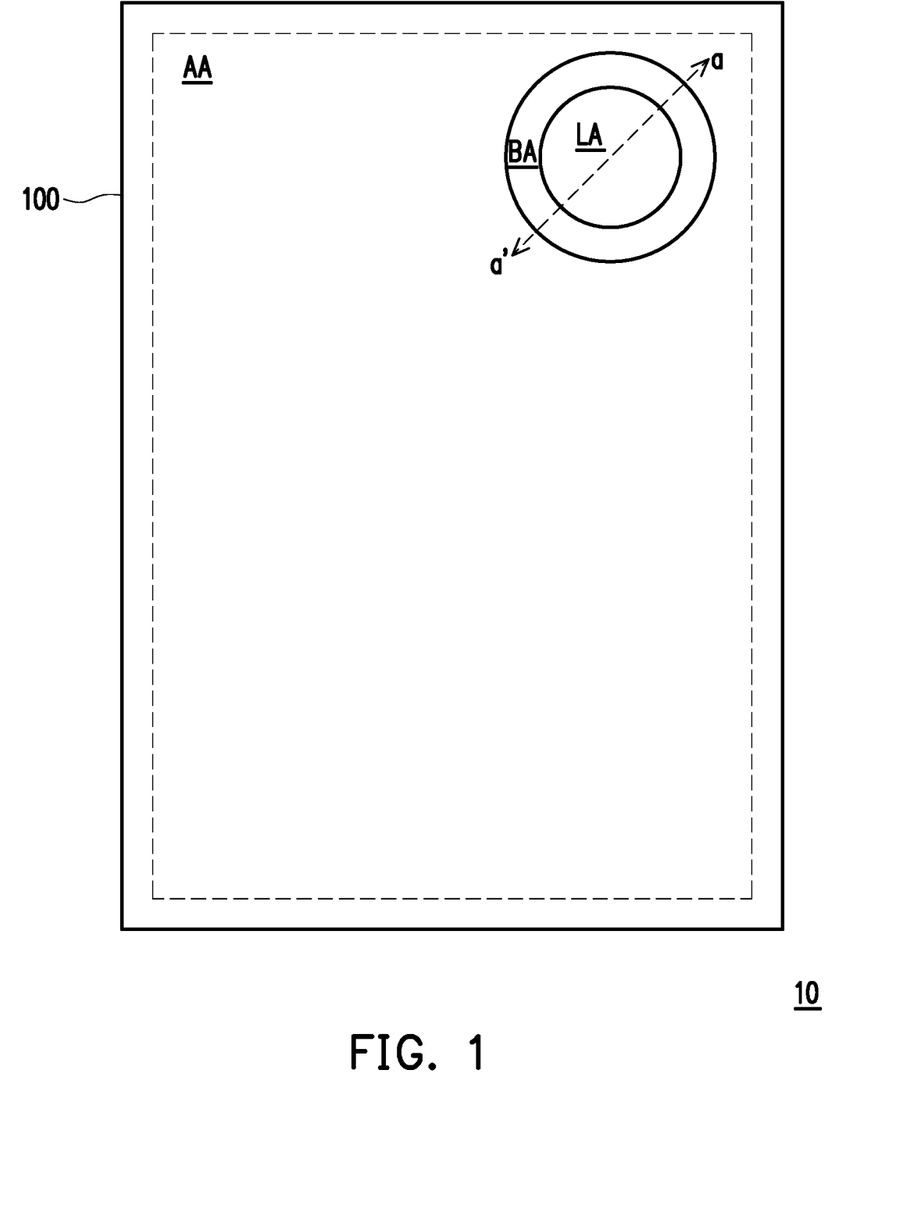
FIG. 1 is a top view of a display device according to an embodiment of the invention.
Figure 2:
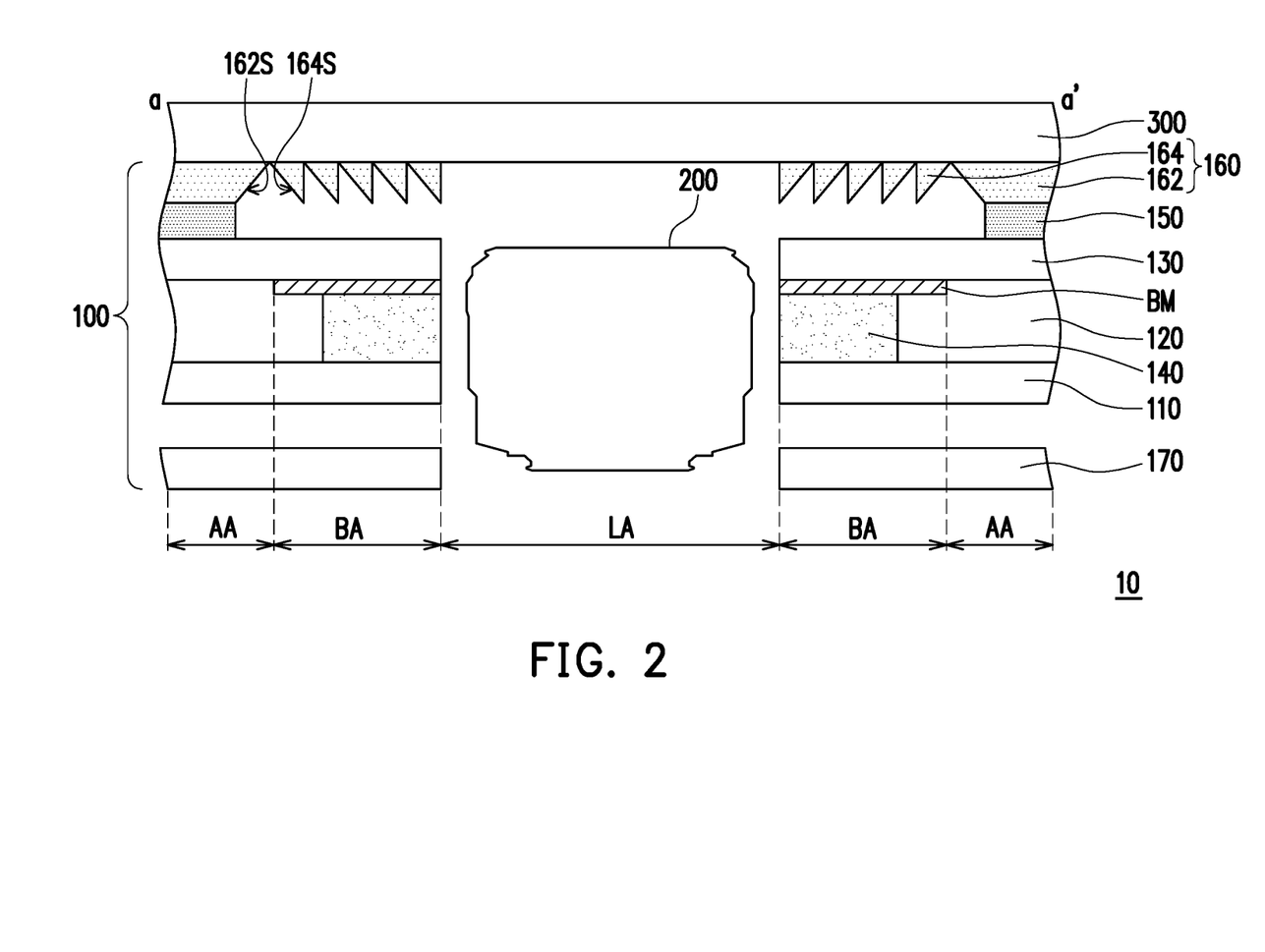
FIG. 2 is a cross-sectional view along section line aa' in FIG. 1.

FIG. 1 is a top view of a display device according to an embodiment of the invention. FIG. 2 is a cross-sectional view along section line aa' in FIG. 1.

Referring to FIG. 1 and FIG. 2, a display device 10 includes a display module 100, a lens module 200 and a transparent cover 300.

The display module 100 is provided with a lens area LA and a display area AA disposed outside the lens area LA. In the present embodiment, the display area AA surrounds the lens area LA, but the invention is not limited thereto. In other embodiments, the display area AA partially surrounds the lens area LA. In the present embodiment, a shading area BA is also formed between the display area AA and the lens area LA. The shading area BA surrounds the lens area LA. The lens module 200 is disposed in the lens area LA. The transparent cover 300 covers the display module 100 and the lens module 200.

In the present embodiment, the display module 100 is a liquid crystal display device, but the invention is not limited thereto. The display module 100 includes a backlight module 170, a pixel array substrate 110, a display medium layer 120, a sealant 140, a shading layer BM, a counter substrate 130, a transparent adhesive layer 150 and a prism layer 160.

A pixel array (not shown) is disposed on the pixel array substrate 110. A filter element (not shown) is disposed on the counter substrate 130 or the pixel array substrate 110.

The pixel array substrate 110 is about 100 to 500 microns thick, for example, but the invention is not limited thereto. The counter substrate 130 is about 100 to 500 microns thick, for example, but the invention is not limited thereto. The transparent cover 300 is about 300 to 1,000 microns thick, for example, but the invention is not limited thereto.

Materials for the pixel array substrate 110, the counter substrate 130 and the transparent cover 300 are, for example, glass, quartz, organic compounds or other suitable materials.

The display medium layer 120 is located between the pixel array substrate 110 and the counter substrate 130. The display medium layer 120 includes, for example, a liquid crystal molecule. The sealant 140 seals the display medium layer 120 between the pixel array substrate 110 and the counter substrate 130.

The shading layer BM defines the shading area BA surrounding the lens area LA. The shading layer BM is located between the pixel array substrate 110 and the counter substrate 130. In the present embodiment, the shading layer BM is located on the counter substrate, but the invention is not limited thereto. In other embodiments, the shading layer BM is located on the pixel array substrate 110.

The transparent adhesive layer 150 is located on the counter substrate 130. The display module 100 is provided with the prism layer 160 surrounding the lens area LA. In the present embodiment, the transparent adhesive layer 150 is located between the counter substrate 130 and the prism layer 160. The prism layer 160 is located between the transparent cover 300 and the transparent adhesive layer 150. In the present embodiment, a refractive index of the prism layer 160 is substantially equal to a refractive index of the transparent adhesive layer 150. For example, the refractive index is about 1.5, but the invention is not limited thereto. The transparent adhesive layer 150 is about 50 to 200 microns thick, for example.

In the present embodiment, the prism layer 160 includes an optical layer 162 and multiple prism structures 164. In the present embodiment, the optical layer 162 and the prism structures 164 are located on an inner side of the transparent cover 300. In the present embodiment, the optical layer 162 is located in the display area AA, and the prism structures 164 surround the lens area LA. The prism structures 164 are located between the display area AA and the lens area LA. The prism structures 164 are located, for example, in the shading area BA. In the present embodiment, the prism structures 164 are disposed within a width range of 500 microns around the lens area LA, and the shading layer BM is disposed within a width range of about 500 microns around the lens area LA, but the invention is not limited thereto. In the present embodiment, a total width of the multiple prism structures 164 is less than a width of the shading layer BM, but the invention is not limited thereto. In other embodiments, the total width of the multiple prism structures 164 is greater than the width of the shading layer BM.

In the present embodiment, each prism structure 164 is approximately shaped into a ring, and each prism structure 164 is provided with a lateral surface 164S facing the outside. In the present embodiment, the multiple prism structures 164 surround the lens area LA in a manner of forming concentric rings. The number and shapes of the prism structures 164 may be adjusted according to a practical requirement.

Air exists between the optical layer 162 and the prism structures 164. For example, air exists between a lateral surface 162S, facing the prism structures 164, of the optical layer 162 and the lateral surfaces 164S, facing the optical layer 162, of the prism structures 164.

Figure 3A:
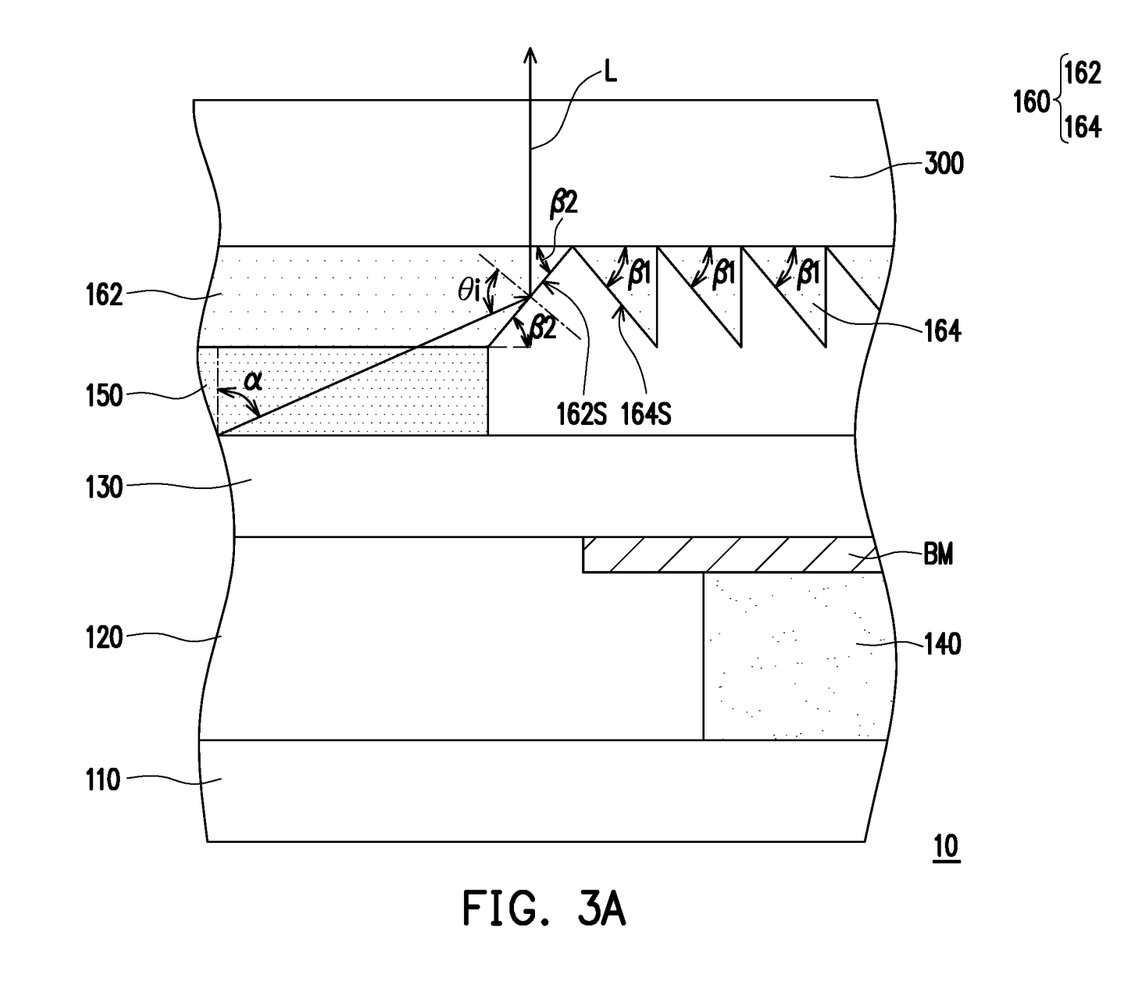
FIG. 3A is a partial enlarged view of FIG. 2.

FIG. 3A is a partial enlarged view of FIG. 2. FIG. 3A shows a light path diagram of light L emitted by the backlight module 170.

Referring to FIG. 3A, an included angle $\beta 2$ is formed between the lateral surface 162S of the optical layer 162 and an inner side of the transparent cover 300, and an included angle $\beta 1$ is formed between the lateral surface 164S, facing the optical layer 162, of each prism structure 164 and the inner side of the transparent cover 300. In the present embodiment, the included angle $\beta 1$ is equal to the included angle $\beta 2$.

The light L leaves the counter substrate 130 at an emergence angle $\alpha$. In other words, the angle $\alpha$ is the emergence angle of the light L leaving the counter substrate 130. The light L reaches the lateral surface 162S, facing the prism structures 164, of the optical layer 162 at an incidence angle $\theta i$.

In FIG. 3A, the angle $\theta i$ is equal to the included angle $\beta 2$, and the light L leaves the prism layer 160 and the transparent cover 300 substantially in a direction parallel to a normal of the transparent cover 300.

In the present embodiment, the included angle $\beta 2 < 180°-$ angle $\alpha - \theta_c$, where $\theta_c$ is a total reflection angle between the prism layer 160 and the air. Therefore, influence caused by stray light on the light receiving quality of the lens module is effectively improved.

Figure 3B:
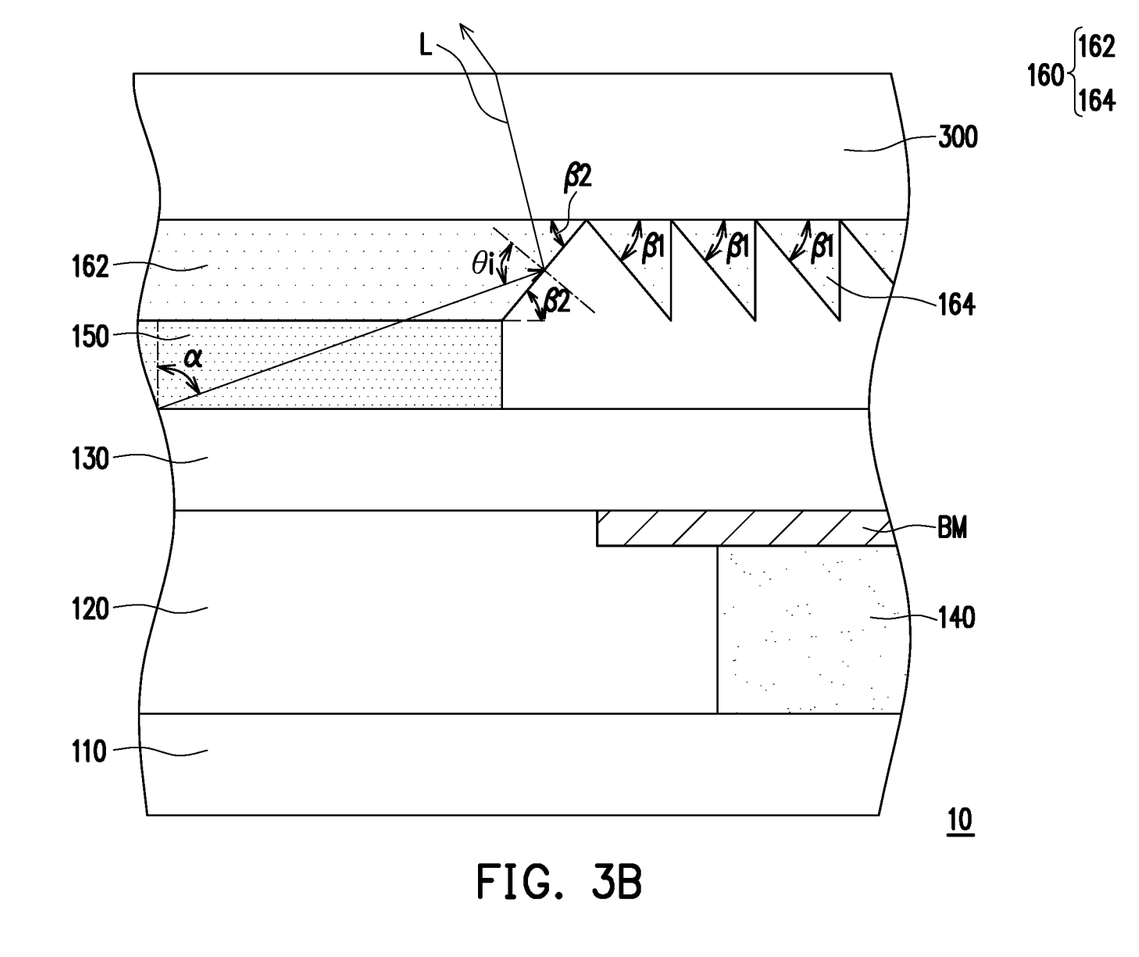
FIG. 3B is a partial enlarged view of FIG. 2.

FIG. 3B is a partial enlarged view of FIG. 2. FIG. 3B shows a light path diagram of the light L emitted by the backlight module 170.

In FIG. 3B, the angle $\theta i$ is smaller than the included angle $\beta 2$. The light, after leaving the transparent cover 300, is refracted to a direction far away from the lens module. Therefore, the influence caused by the stray light on the light receiving quality of the lens module is effectively improved.

Figure 3C:
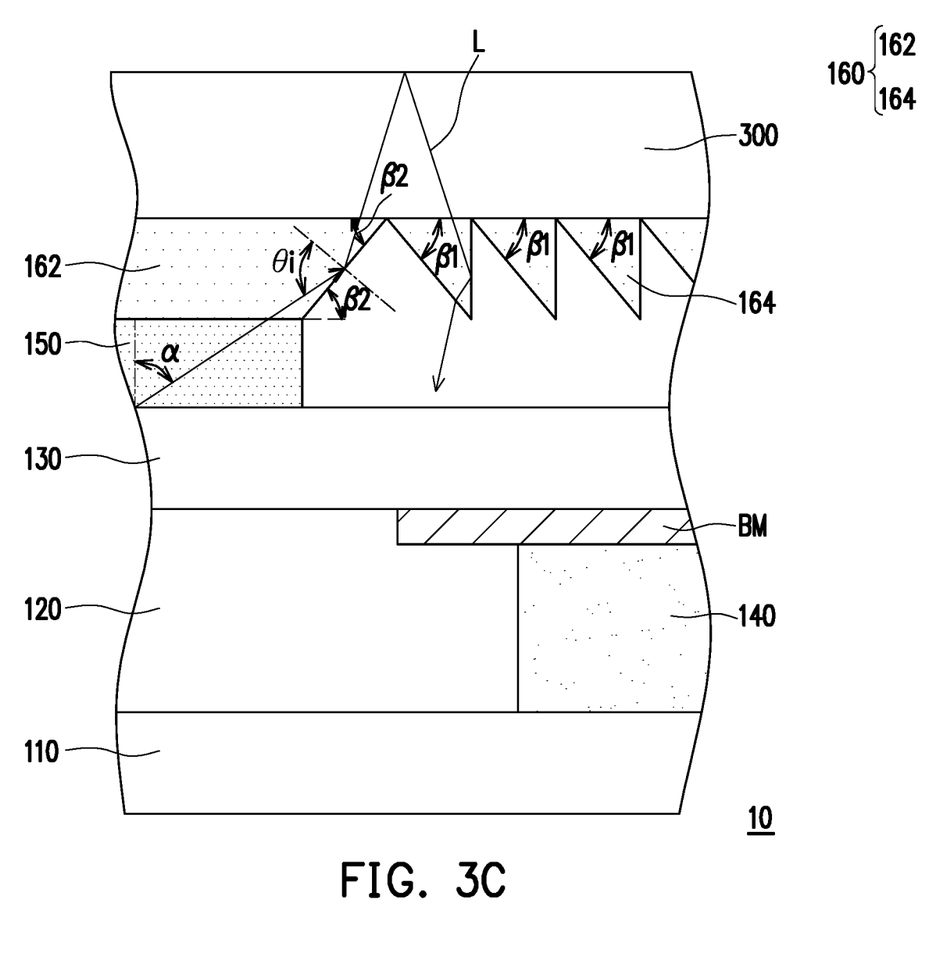
FIG. 3C is a partial enlarged view of FIG. 2.
Figure 3D:
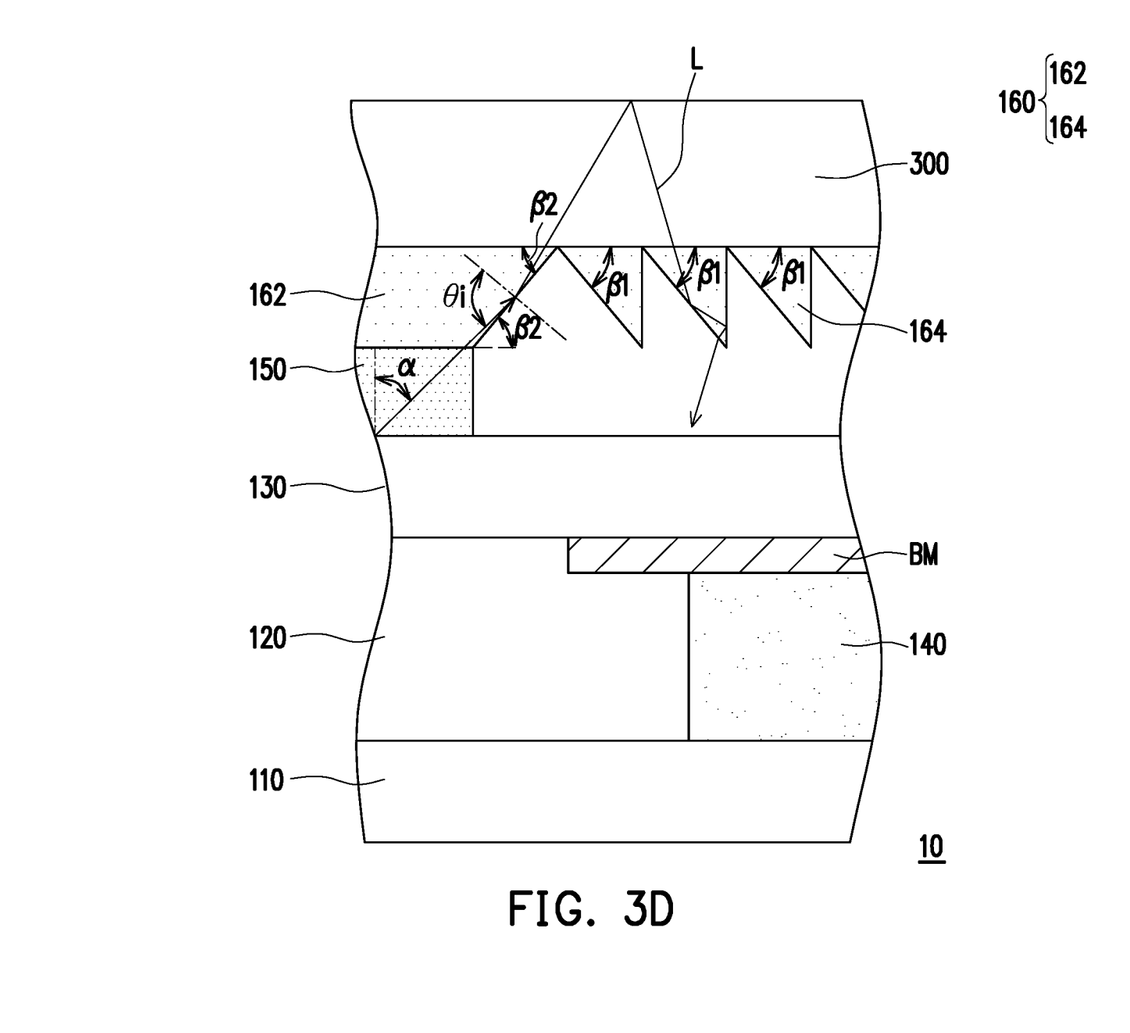
FIG. 3D is a partial enlarged view of FIG. 2.

FIG. 3C is a partial enlarged view of FIG. 2. FIG. 3C shows a light path diagram of the light L emitted by the backlight module 170. FIG. 3D is a partial enlarged view of FIG. 2. FIG. 3D shows a light path diagram of the light L emitted by the backlight module 170.

In FIG. 3C and FIG. 3D, the angle $\theta i$ is larger than the included angle $\beta 2$. The angle $\theta i$ in FIG. 3D is larger than the angle $\theta i$ in FIG. 3C. The light L is reflected by an interface of the transparent cover 300 and the air to the prism structures 164, and the prism structures 164 stop the light L from advancing to the lens module and refract and/or reflect the light L to the shading layer BM, so that the influence caused by the stray light on the light receiving quality of the lens module is effectively improved.

Based on the above, through the prism layer surrounding the lens area, the influence caused by the stray light in the display module on the lens module is avoided, and thus the light receiving quality of the lens module is effectively improved.

Figure 4:
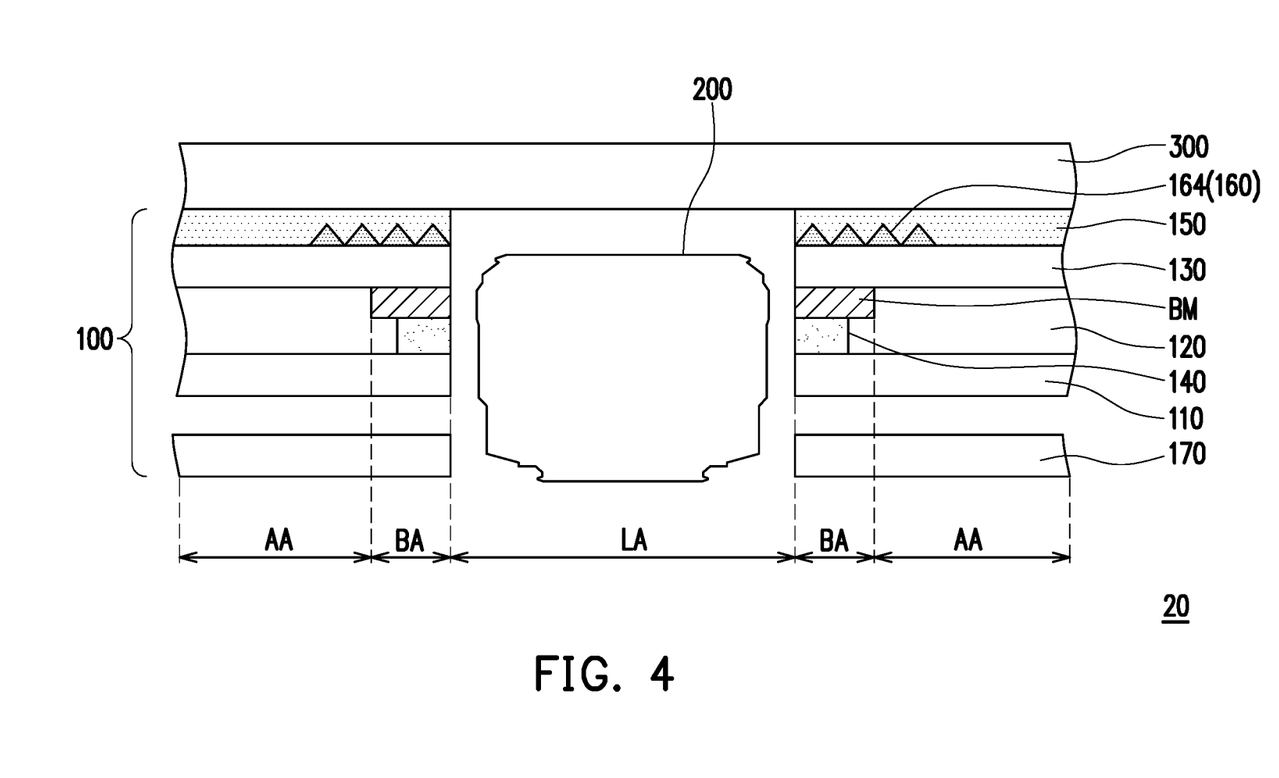
FIG. 4 is a cross-sectional view of a display device according to an embodiment of the invention.

FIG. 4 is a cross-sectional view of a display device according to an embodiment of the invention. It is to be noted here that element sign numbers and part of contents of the embodiments shown in FIG. 1 and FIG. 2 apply to the embodiment shown in FIG. 4, the same or similar sign numbers are adopted to denote the same or similar elements, and descriptions about the same technical contents are omitted. Reference may be made to the aforementioned embodiments for descriptions of the omitted part, which will not be repeatedly described herein.

The main difference between a display device 20 in FIG. 4 and the display device 10 in FIG. 2 is that the prism layer 160 of the display device 20 is located between the transparent adhesive layer 150 and the counter substrate 130.

Referring to FIG. 4, the prism layer 160 includes multiple prism structures 164, and the prism structures 164 are located between the transparent adhesive layer 150 and the counter substrate 130. In the present embodiment, part of the prism structures 164 are located in the display area AA, and part of the prism structures 164 are located in the shading area BA. In the present embodiment, the prism structures 164 protrude from the counter substrate 130 toward the transparent cover 300. In the present embodiment, the refractive index of the prism layer 160 is greater than the refractive index of the transparent adhesive layer 150.

In the present embodiment, each prism structure 164 is approximately shaped into a ring, and a cross section of each prism structure 164 is shaped into a triangle. For example, the cross section of each prism structure 164 is shaped into a regular triangle, but the invention is not limited thereto.

Figure 5:
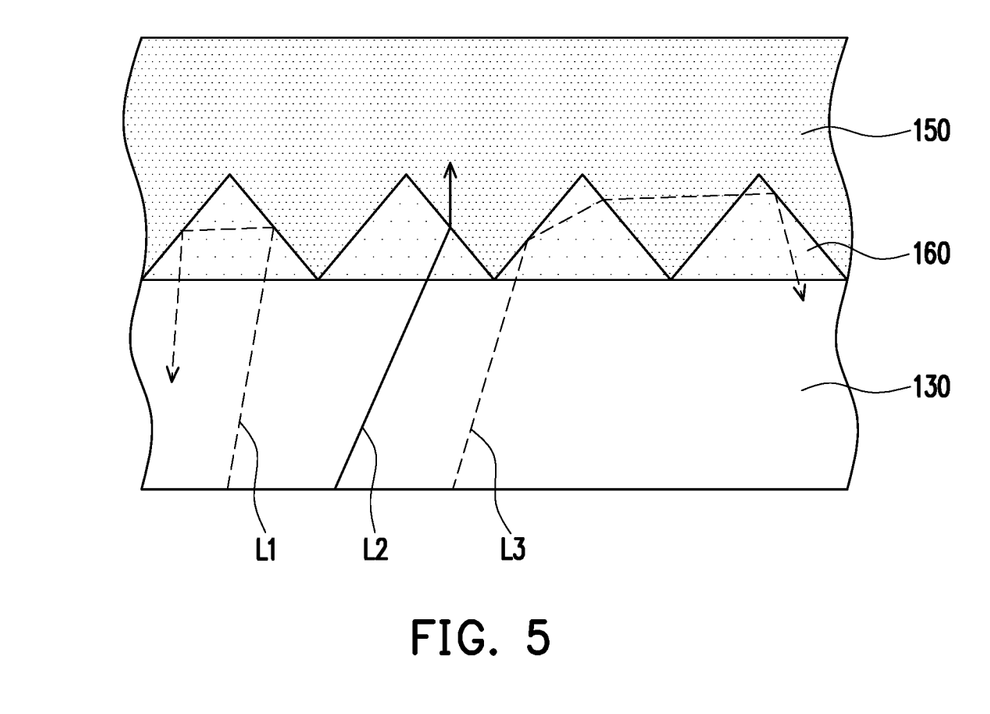
FIG. 5 is a partial enlarged view of FIG. 4.

FIG. 5 is a partial enlarged view of FIG. 4. FIG. 5 shows a light path diagram of light L1 to light L3 emitted by the backlight module 170.

In the present embodiment, the light L2 is refracted at an interface of the prism layer 160 and the transparent adhesive layer 150, and leaves the prism layer 160 in a direction substantially perpendicular to the counter substrate 130. The light L1 and the light L3 are refracted and/or reflected back to the counter substrate 130 by the prism layer 160. In the present embodiment, the prism layer 160 realizes a light collecting function to make the light passing through the prism layer 160 and advancing to the transparent cover 300 substantially parallel to a normal direction of the counter substrate 130.

Based on the above, through the prism layer, incidence of the light around the lens area to the transparent cover at a large viewing angle is reduced, the light reflected by the transparent cover is prevented from entering the lens module, and the light receiving quality of the lens module is improved.

Figure 6:
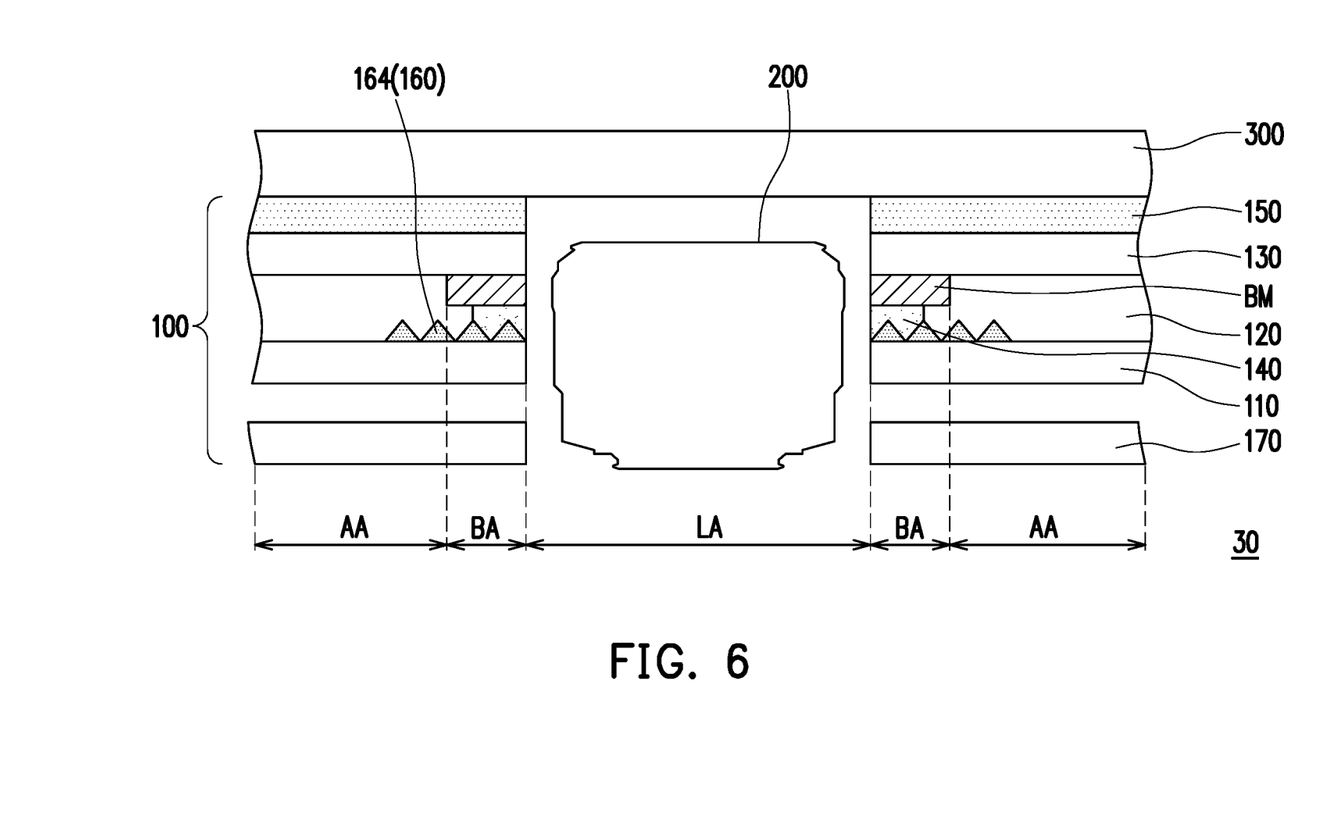
FIG. 6 is a cross-sectional view of a display device according to an embodiment of the invention.

FIG. 6 is a cross-sectional view of a display device according to an embodiment of the invention. It is to be noted here that the element sign numbers and part of contents of the embodiments shown in FIG. 4 and FIG. 5 apply to the embodiment shown in FIG. 6, the same or similar sign numbers are adopted to denote the same or similar elements, and descriptions about the same technical contents are omitted. Reference may be made to the aforementioned embodiments for descriptions of the omitted part, which will not be repeatedly described herein.

The main difference between a display device 30 in FIG. 6 and the display device 20 in FIG. 4 is that the prism layer 160 of the display device 30 is located between the display medium layer 120 and the pixel array substrate 110.

Referring to FIG. 6, the prism layer 160 includes multiple prism structures 164. The prism structures 164 protrude from the pixel array substrate 110 toward the transparent cover 300. Part of the prism structures 164 are located between the display medium layer 120 and the pixel array substrate 110. In the present embodiment, part of the prism structures 164 are located between the sealant 140 and the pixel array substrate 110, but the invention is not limited thereto. In the present embodiment, the refractive index of the prism layer 160 is greater than a refractive index of the display medium layer 120.

In the present embodiment, the prism layer 160 realizes a light collecting function to make light passing through the prism layer 160 and advancing to the transparent cover 300 substantially parallel to a normal direction of the pixel array substrate 110.

Based on the above, through the prism layer, incidence of the light around the lens area to the transparent cover at a large viewing angle is reduced, the light reflected by the transparent cover is prevented from entering the lens module, and the light receiving quality of the lens module is improved.

Figure 7:
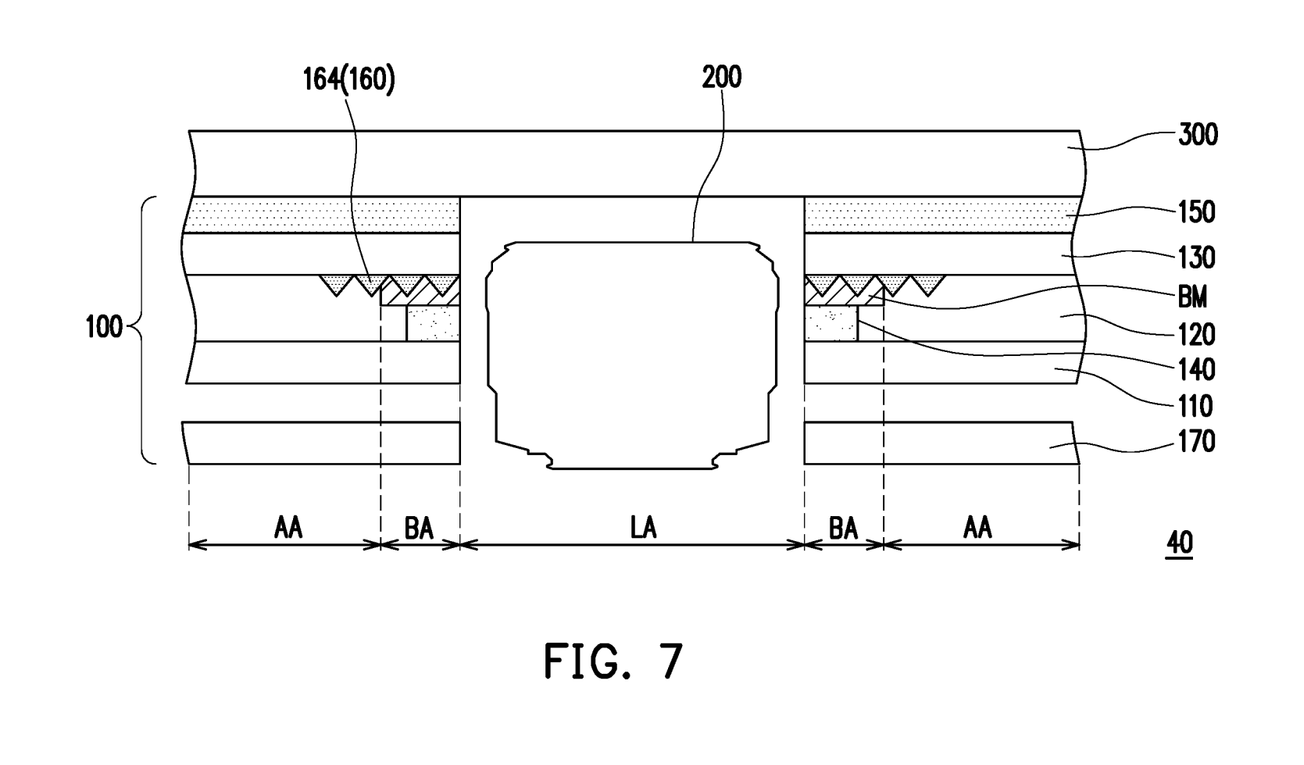
FIG. 7 is a cross-sectional view of a display device according to an embodiment of the invention.

FIG. 7 is a cross-sectional view of a display device according to an embodiment of the invention. It is to be noted here that the element sign numbers and part of contents of the embodiment shown in FIG. 6 apply to the embodiment shown in FIG. 7, the same or similar sign numbers are adopted to denote the same or similar elements, and descriptions about the same technical contents are omitted. Reference may be made to the aforementioned embodiments for descriptions of the omitted part, which will not be repeatedly described herein.

The main difference between a display device 40 in FIG. 7 and the display device 30 in FIG. 6 is that the prism layer 160 of the display device 40 is located between the display medium layer 120 and the counter substrate 130.

Referring to FIG. 7, the prism layer 160 includes multiple prism structures 164. The prism structures 164 protrude from the counter substrate 130 toward the pixel array substrate 110. Part of the prism structures 164 are located between the display medium layer 120 and the counter substrate 130. In the present embodiment, part of the prism structures 164 are located between the shading layer BM and the counter substrate 130, but the invention is not limited thereto. In the present embodiment, the refractive index of the prism layer 160 is less than the refractive index of the display medium layer 120.

Figure 8:
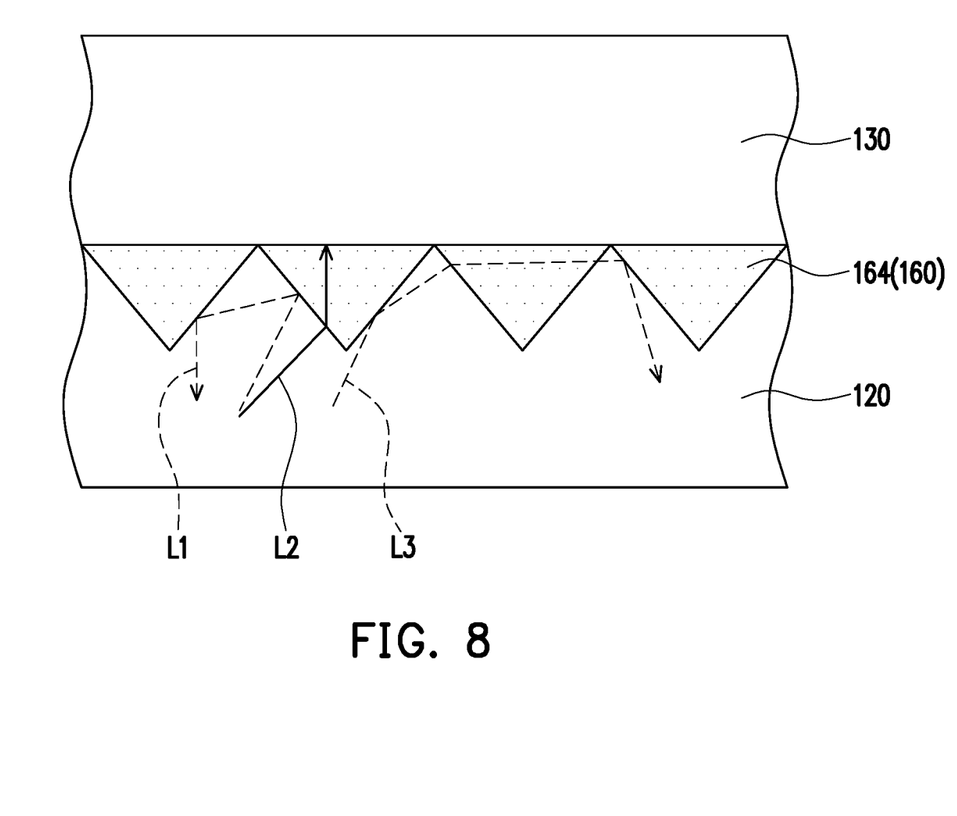
FIG. 8 is a partial enlarged view of FIG. 7.

FIG. 8 is a partial enlarged view of FIG. 7. FIG. 8 shows a light path diagram of light L1 to light L3 emitted by the backlight module 170.

In the present embodiment, the light L2 is refracted at an interface of the prism layer 160 and the display medium layer 120, and enters the counter substrate 130 in a direction substantially perpendicular to the counter substrate 130. The light L1 and the light L3 are refracted and/or reflected back to the display medium layer 120 by the prism layer 160. In the present embodiment, the prism layer 160 realizes a light collecting function to make the light passing through the prism layer 160 and advancing to the transparent cover 300 substantially parallel to the normal direction of the counter substrate 130.

Based on the above, through the prism layer, incidence of the light around the lens area to the transparent cover at a large viewing angle is reduced, the light reflected by the transparent cover is prevented from entering the lens module, and the light receiving quality of the lens module is improved.

Figure 9:
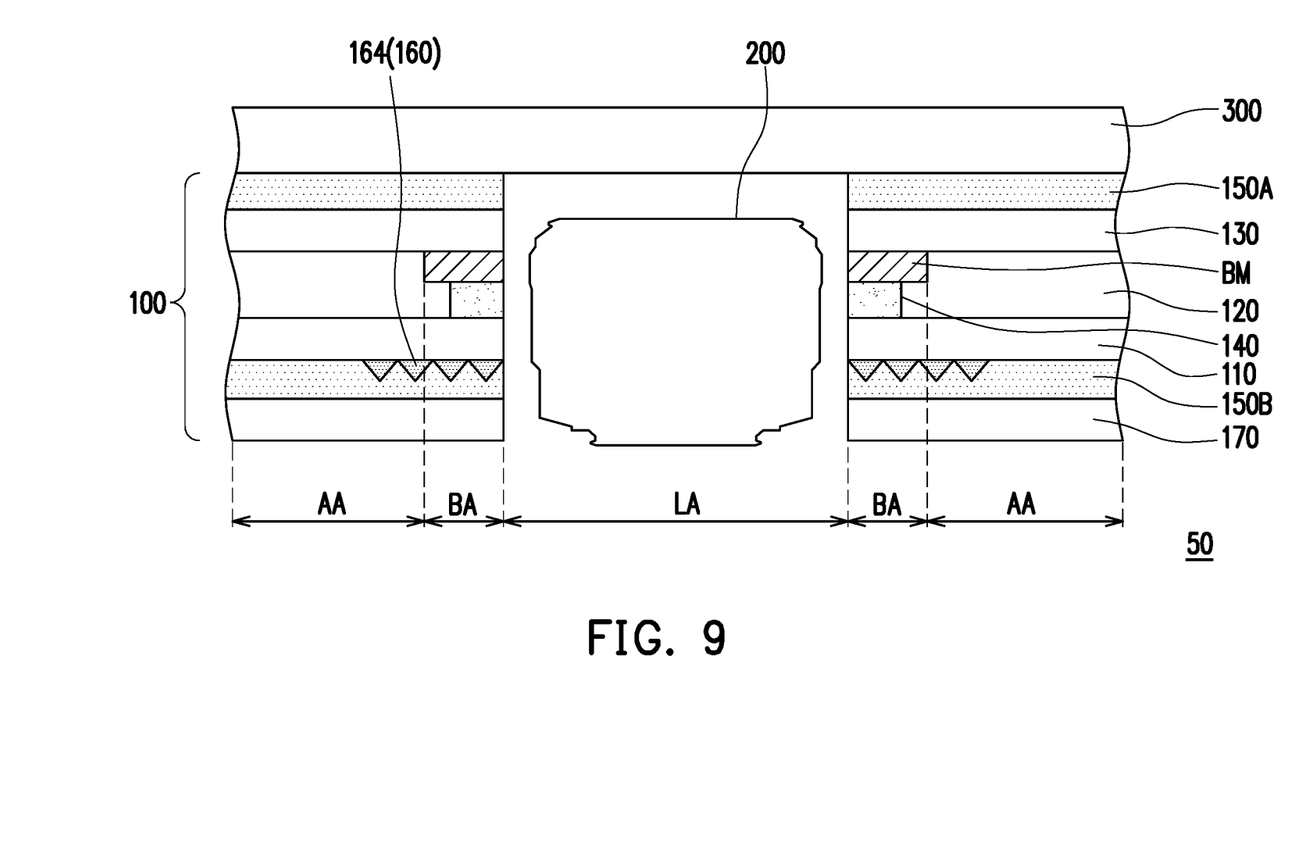
FIG. 9 is a cross-sectional view of a display device according to an embodiment of the invention.

FIG. 9 is a cross-sectional view of a display device according to an embodiment of the invention. It is to be noted here that the element sign numbers and part of contents of the embodiments shown in FIG. 7 and FIG. 8 apply to the embodiment shown in FIG. 9, the same or similar sign numbers are adopted to denote the same or similar elements, and descriptions about the same technical contents are omitted. Reference may be made to the aforementioned embodiments for descriptions of the omitted part, which will not be repeatedly described herein.

The main difference between a display device 50 in FIG. 9 and the display device 40 in FIG. 7 is that the display device 50 includes a first transparent adhesive layer 150A and a second transparent adhesive layer 150B and the prism layer 160 is located between the second transparent adhesive layer 150B and the pixel array substrate 110.

Referring to FIG. 9, the first transparent adhesive layer 150A is located between the counter substrate 130 and the transparent cover 300. The second transparent adhesive layer 150B is located between the backlight module 170 and the pixel array substrate 110, and the pixel array substrate 110 is located between the second transparent adhesive layer 150B and the display medium layer 120. The first transparent adhesive layer 150A and the second transparent adhesive layer 150B are made from the same or different materials.

The prism layer 160 includes multiple prism structures 164. The prism structures 164 protrude from the pixel array substrate 110 toward the backlight module 170. In the present embodiment, the refractive index of the prism layer 160 is less than a refractive index of the second transparent adhesive layer 150B.

In the present embodiment, the prism layer 160 realizes a light collecting function to make light passing through the prism layer 160 and advancing to the transparent cover 300 substantially parallel to a normal direction of the pixel array substrate 110.

Based on the above, through the prism layer, incidence of the light around the lens area to the transparent cover at a large viewing angle is reduced, the light reflected by the transparent cover is prevented from entering the lens module, and the light receiving quality of the lens module is improved.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A display device, comprising:
a display module, comprising a lens area and a display area disposed outside the lens area, wherein the display module comprises a pixel array substrate, a counter substrate and a backlight module, and the backlight module is disposed under the pixel array substrate and the counter substrate;
a lens module, disposed in the lens area;
a transparent cover, covering the display module; and
a prism layer, surrounding the lens area and disposed on the pixel array substrate, the counter substrate or the transparent cover.

2. The display device according to claim 1, wherein the display module further comprises:
a shading layer, located between the pixel array substrate and the counter substrate; and
a transparent adhesive layer, located between the counter substrate and the prism layer, wherein the prism layer comprises an optical layer and multiple prism structures, air exists between the optical layer and the prism structures, the optical layer is located in the display area, and the prism structures surround the lens area.

3. The display device according to claim 2, wherein the optical layer and the prism structures are located on an inner side of the transparent cover, an included angle $\beta1$ is formed between a lateral surface, facing the optical layer, of each of the prism structures and the inner side of the transparent cover, and an included angle $\beta2$ is formed between a lateral surface of the optical layer and the inner side of the transparent cover, the included angle $\beta1$ being equal to the included angle $\beta2$.

4. The display device according to claim 3, wherein the included angle $\beta2 < 180° - $ angle $\alpha - \theta_c$, where $\theta_c$ is a total reflection angle between the prism layer and air, and the angle $\alpha$ is an emergence angle of light leaving the counter substrate.

5. The display device according to claim 2, wherein a refractive index of the prism layer is substantially equal to a refractive index of the transparent adhesive layer.

6. The display device according to claim 1, wherein the display module further comprises:
a shading layer, located between the pixel array substrate and the counter substrate; and
a transparent adhesive layer, located between the counter substrate and the transparent cover, wherein the prism layer comprises multiple prism structures, and the prism structures are located between the transparent adhesive layer and the counter substrate.

7. The display device according to claim 6, wherein a refractive index of the prism layer is greater than a refractive index of the transparent adhesive layer.

8. The display device according to claim 1, wherein the display module further comprises:
a display medium layer, located between the pixel array substrate and the counter substrate, wherein the prism layer comprises multiple prism structures, and part of the prism structures are located between the display medium layer and the pixel array substrate;
a shading layer, located between the pixel array substrate and the counter substrate; and
a transparent adhesive layer, located between the counter substrate and the transparent cover.

9. The display device according to claim 8, wherein a refractive index of the prism layer is greater than a refractive index of the display medium layer.

10. The display device according to claim 1, wherein the display module further comprises:
a display medium layer, located between the pixel array substrate and the counter substrate, wherein the prism layer comprises multiple prism structures, and part of the prism structures are located between the display medium layer and the counter substrate;
a shading layer, located between the pixel array substrate and the counter substrate; and
a transparent adhesive layer, located between the counter substrate and the transparent cover.

11. The display device according to claim 10, wherein a refractive index of the prism layer is less than a refractive index of the display medium layer.

12. The display device according to claim 1, wherein the display module further comprises:
a shading layer, located between the pixel array substrate and the counter substrate;
a first transparent adhesive layer, located between the counter substrate and the transparent cover; and
a second transparent adhesive layer, wherein the pixel array substrate is located between the second transparent adhesive layer and a display medium layer, and the prism layer is located between the second transparent adhesive layer and the pixel array substrate.

13. The display device according to claim 12, wherein a refractive index of the prism layer is less than a refractive index of the second transparent adhesive layer.

14. The display device according to claim 1, wherein the prism layer comprises multiple prism structures, and the prism structures are disposed within a width range of 500 microns around the lens area.

15. The display device according to claim 1, wherein the display area surrounds the lens area.

16. The display device according to claim 1, wherein the pixel array substrate and the counter substrate are not located in the lens area.

17. The display device according to claim 1, wherein a light is emitted by the backlight module, and the prism layer prevents the light emitted by the backlight module from entering the lens module.

* * * * *